(12) United States Patent
Wang et al.

(10) Patent No.: US 12,527,105 B2
(45) Date of Patent: Jan. 13, 2026

(54) SHORT-WAVE INFRARED SPECTRUM DETECTOR AND PREPARATION METHOD THEREOF

(71) Applicant: Shanghai Institute of Technical Physics, Chinese Academy of Sciences, Shanghai (CN)

(72) Inventors: Shaowei Wang, Shanghai (CN); Zhiyi Xuan, Shanghai (CN); Qingquan Liu, Shanghai (CN); Wei Lu, Shanghai (CN)

(73) Assignee: Shanghai Institute of Technical Physics, Chinese Academy of Sciences, Shanghai (CN)

( * ) Notice: Subject to any disclaimer, the term of this patent is extended or adjusted under 35 U.S.C. 154(b) by 390 days.

(21) Appl. No.: 18/342,620

(22) Filed: Jun. 27, 2023

(65) Prior Publication Data
US 2023/0343804 A1    Oct. 26, 2023

Related U.S. Application Data

(63) Continuation of application No. PCT/CN2023/075149, filed on Feb. 9, 2023.

(30) Foreign Application Priority Data

Feb. 11, 2022 (CN) .......................... 202210133188.1

(51) Int. Cl.
*H10K 39/00* (2023.01)
*G01J 5/10* (2006.01)
(Continued)

(52) U.S. Cl.
CPC ............ *H10F 39/8067* (2025.01); *G01J 5/10* (2013.01); *H10F 39/024* (2025.01); *H10F 39/1843* (2025.01); *G01J 2005/106* (2013.01)

(58) Field of Classification Search
CPC ............... H10F 39/8067; H10F 39/024; H10F 39/1843; H10F 39/806; H10F 39/018;
(Continued)

(56) References Cited

U.S. PATENT DOCUMENTS

2004/0217264 A1* 11/2004 Wood ...................... G01J 3/427
250/214 R
2015/0200314 A1* 7/2015 Webster ................ H10F 39/807
257/438
(Continued)

*Primary Examiner* — Samuel Park
(74) *Attorney, Agent, or Firm* — Westbridge IP LLC (57) ABSTRACT

Disclosed is a short-wave infrared spectrum detector, including: a photosensitive chip, including a plurality of detection pixels; a substrate; and a wavelength division component array, including a plurality of wavelength division pixels, each of the plurality of wavelength division pixels corresponding to a narrowband transmission spectrum, wherein the photosensitive chip and the wavelength division component array are monolithically integrated on both sides of the substrate, and an orthographic projection of each of the plurality of wavelength division pixels on the substrate covers an orthographic projection of at least one detection pixel on the substrate. The wavelength division structure and the photosensitive chip are integrated, so that each pixel has the ability of frequency-selective light spectrum detection, and a short-wave infrared spectrum detector integrated with wavelength division and detection is formed, realizing the miniaturization of the short-wave infrared spectral detection system.

10 Claims, 6 Drawing Sheets

(51) Int. Cl.
*H10F 39/00* (2025.01)
*H10F 39/18* (2025.01)

(58) Field of Classification Search
CPC ..... H10F 39/809; G01J 5/10; G01J 2005/106;
G01J 2003/2806; G01J 3/0259; G01J
3/26; G01J 3/2803; G01J 3/2823; Y02P
70/50
See application file for complete search history.

(56) References Cited

U.S. PATENT DOCUMENTS

| | | | |
|---|---|---|---|
| 2019/0371852 A1* | 12/2019 | Anzagira | H10F 39/8067 |
| 2020/0309603 A1* | 10/2020 | Varpula | G01J 5/20 |
| 2022/0179159 A1* | 6/2022 | Wu | G02B 6/4271 |
| 2023/0054279 A1* | 2/2023 | Wang | H10F 39/806 |

* cited by examiner

FIG. 1

| Forming a microcavity lower layer DBR on a second surface of a substrate, where the substrate includes a first surface and the second surface which is opposite to the first surface, a photosensitive chip is formed on the first surface, and the photosensitive chip includes a plurality of detection pixels | S110 |

↓

| Forming an intermediate cavity layer on a side, away from the substrate, of the microcavity lower layer DBR, and performing micro-nano processing on the intermediate cavity layer | S120 |

↓

| Forming a microcavity upper layer DBR on a side, away from the microcavity lower layer DBR, of the intermediate cavity layer | S130 |

SHORT-WAVE INFRARED SPECTRUM DETECTOR AND PREPARATION METHOD THEREOF

CROSS-REFERENCE TO RELATED APPLICATIONS

This application is a continuation of International Application No. PCT/CN2023/075149, filed on Feb. 9, 2023, which claims priority to Chinese Patent Application No. 202210133188.1, filed on Feb. 11, 2022. The disclosures of the aforementioned applications are hereby incorporated by reference in their entireties.

TECHNICAL FIELD

The present disclosure relates to the field of infrared detectors, in particular to a short-wave infrared spectrum detector and a preparation method thereof.

BACKGROUND

Spectroscopy plays an irreplaceable role in remote sensing, material analysis, medical testing and other fields, and has penetrated into all aspects of our life and production. In an infrared multi-spectral field, a wavelength division component enables a detector to have the detection capability of spectral dimension. A commonly used dispersion wavelength division component or an interference wavelength division component such as a grating, a prism, a Michelson interferometer, etc., is assembled into a multi-spectral detector or a hyperspectral detector with an infrared detector through a mechanical device, resulting in high cost and bulky volume of an infrared multi-spectral detection system, which is not suitable for portable application scenarios.

At present, the wavelength division component used in a portable hyperspectral detection system is mostly a spliced filter array, a digital tunable spectrometer, and the like. Although such wavelength division component is miniaturized, it is prone to have the problems of incident light crosstalk and stray light introduction during spectral detection, resulting in poor detection effect.

SUMMARY

In view of this, the present disclosure proposes a short-wave infrared spectrum detector and a preparation method thereof, aiming to solve the above-mentioned problems in related technologies.

A first aspect of the present disclosure provides a short-wave infrared spectrum detector, including: a photosensitive chip, including a plurality of detection pixels; a substrate; and a wavelength division component array, including a plurality of wavelength division pixels, each of the plurality of wavelength division pixels corresponding to a narrow-band transmission spectrum, where the photosensitive chip and the wavelength division component array are monolithically integrated on both sides of the substrate, and an orthographic projection of each of the plurality of wavelength division pixels on the substrate covers an orthographic projection of at least one detection pixel on the substrate.

In some implementations, the short-wave infrared spectrum detector provided by the present disclosure further includes: a silicon-based readout circuit, arranged on a side, away from the substrate, of the photosensitive chip; and an In column interconnection layer, arranged between the photosensitive chip and the silicon-based readout circuit, configured to transmit an electrical signal of the photosensitive chip to the silicon-based readout circuit.

In some implementations, the wavelength division component array is an integrated microcavity wavelength division structure array, and each of the plurality of wavelength division pixels is one microcavity wavelength division structure unit, and the microcavity wavelength division structure unit includes a microcavity lower layer DBR (Distributed Bragg Reflector), an intermediate cavity layer and a microcavity upper layer DBR.

In some implementations, the microcavity lower layer DBR and/or the microcavity upper layer DBR are composed of m pairs of high and low refractive index film layers, and the pair of high and low refractive index film layers includes one high refractive index film layer and one low refractive index film layer, and a value of m is 2~30.

In some implementations, a thickness of the intermediate cavity layer is 0.1-10 μm.

In some implementations, the plurality of wavelength division pixels are arranged in one dimension or two dimensions.

In some implementations, the plurality of wavelength division pixels comprise a plurality of super-pixel structures arranged in an array, and each of the plurality of super-pixel structures comprises a plurality of wavelength division pixels arranged in an array.

In some implementations, a thickness of the photosensitive chip is 2~200 μm.

In some implementations, a thickness of the substrate is less than 1000 μm.

A second aspect of the present disclosure provides a method for preparing a short-wave infrared spectrum detector, including: forming a microcavity lower layer DBR on a second surface of a substrate, and the substrate including a first surface and the second surface which is opposite to the first surface, and a photosensitive chip being formed on the first surface, the photosensitive chip including a plurality of detection pixels; forming an intermediate cavity layer on a side, away from the substrate, of the microcavity lower layer DBR, and performing micro-nano processing on the intermediate cavity layer; forming a microcavity upper layer DBR on a side, away from the microcavity lower layer DBR, of the intermediate cavity layer, where the microcavity lower layer DBR, the intermediate cavity layer and the microcavity upper layer DBR form a wavelength division component array, and the wavelength division component array includes a plurality of wavelength division pixels, and an orthographic projection of each of the plurality of wavelength division pixels on the substrate is located on an orthographic projection of at least one detection pixel on the substrate, and micro-nano processing is performed on the intermediate cavity layer, so that each of the plurality of wavelength division pixels corresponds to a narrowband transmission spectrum.

According to the short-wave infrared spectrum detector and the preparation method thereof provided by the present disclosure, the wavelength division component array is directly prepared on the substrate of the photosensitive chip by adopting a monolithic integration method, without using a wavelength division system with a complex structure and a bulky volume, significantly reducing the volume of the detection system, while enabling it to have good spectral recognition ability.

DETAILED DESCRIPTION OF THE EMBODIMENTS

In order to make the objectives, technical solutions and advantages of the present disclosure clearer, the technical solutions of the present disclosure will be clearly described below with reference to the accompanying drawings and embodiments.

A wavelength division component used in a portable spectral detection system in the related art are mostly a spliced filter array, a digital tunable spectroscope, and the like. Although such wavelength division component is miniaturized, it is still assembled separately from a detection chip, which leads to the disadvantages of incident light crosstalk and stray light introduction during spectral detection. Meanwhile, the maintenance cost of the detection system is high due to the aging of a fixing device.

In order to overcome the above-mentioned problems, the present disclosure provides a short-wave infrared spectrum detector integrated with wavelength division and detection by integrating a micro-nano wavelength division component and an infrared detector chip.

Figure 1:
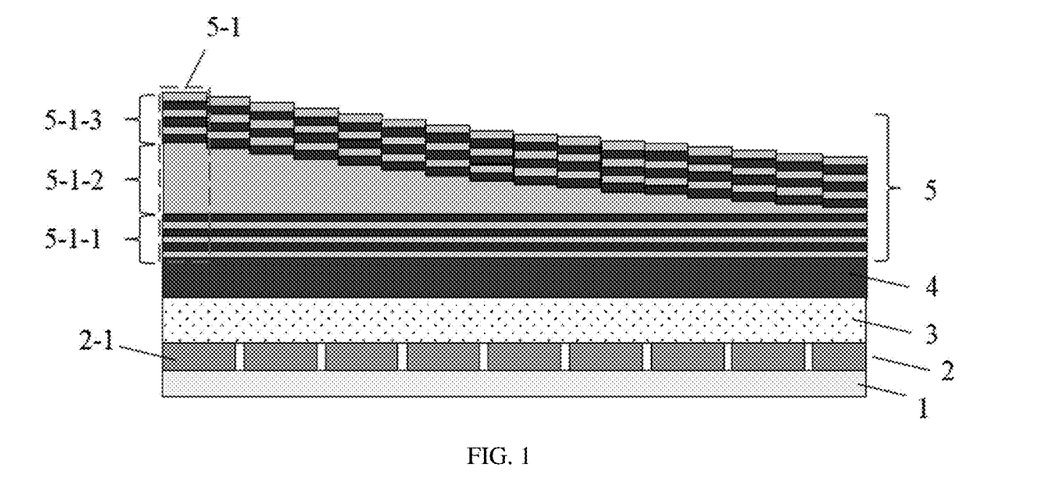
FIG. 1 is a schematic structural diagram of a short-wave infrared spectrum detector according to an embodiment of the present disclosure.

FIG. 1 is a schematic structural diagram of a short-wave infrared spectrum detector according to an embodiment of the present disclosure. As shown in FIG. 1, the short-wave infrared spectrum detector includes: a photosensitive chip 3, including a plurality of detection pixels; a substrate 4; and a wavelength division component array 5, including a plurality of wavelength division pixels 5-1. Each wavelength division pixel 5-1 corresponds to a narrowband transmission spectrum. The photosensitive chip 3 and the wavelength division component array 5 are monolithically integrated on both sides of the substrate 4, and an orthographic projection of a wavelength division pixel 5-1 on the substrate 4 covers an orthographic projection of at least one detection pixel on the substrate 4.

Herein, the photosensitive chip 3 and the wavelength division component array 5 are monolithically integrated on both sides of the substrate 4 without an external mechanical structure for coupling. Moreover, the wavelength division pixels of the wavelength division component array 5 are aligned with the detection pixels of the photosensitive chip 3 in a longitudinal direction of space. Specifically, the alignment relationship between the wavelength division pixels and the detection pixels may be a one-to-one correspondence, or one wavelength division pixel may cover a plurality of detection pixels.

Specifically, the photosensitive chip 3 may be configured to convert a detected light signal into an electrical signal. Preferably, the thickness of the photosensitive chip 3 may be 2~200 μm.

The substrate 4 may be a substrate for the epitaxial growth of the photosensitive chip 3, and the material of the substrate 4 may be InP. Since the substrate 4 is light-transmissive, a light, after being split by the wavelength division component array, may pass through the substrate 4 and then reach the photosensitive chip 3. Preferably, the thickness of the substrate 4 may be less than 1000 μm, for example, 10~1000 μm. Exemplarily, before forming the wavelength division component array 5 on the substrate 4, the thickness of the substrate 4 may be reduced to further improve the light transmission performance of the substrate 4.

According to the short-wave infrared spectrum detector provided by the embodiments of the present disclosure, the wavelength division component array is directly prepared on the substrate of the photosensitive chip by monolithic integration, without using a wavelength division system with a complex structure and a large volume, significantly reducing the volume of the detection system, while enabling it to have good spectral recognition ability.

During spectrum detection, an incident light is transmitted to the photosensitive chip 3 after being subjected to frequency-selective wavelength division by the plurality of wavelength division pixels 5-1 of the wavelength division component array 5, and then the incident light is converted into an electrical signal by the detection pixels located at the corresponding positions on the photosensitive chip 3.

Optionally, the short-wave infrared spectrum detector may further include: a silicon-based readout circuit 1 arranged on a side, away from the substrate 4, of the photosensitive chip 3; and an In column interconnection layer 2, arranged between the photosensitive chip 3 and the silicon-based readout circuit 1 and configured to transmit the electrical signal of the photosensitive chip 3 to the silicon-based readout circuit 1.

In some embodiments, the wavelength division component array 5 may include a plurality of wavelength division pixels arranged in one dimension or two dimensions. For example, N wavelength division pixels 5-1 of the wavelength division component array 5 may cover the entire photosensitive chip 3, and a narrowband transmission channel corresponding to each wavelength division pixel 5-1 covers one or more detection pixels.

In some other embodiments, the wavelength division component array 5 may include a plurality of super-pixel structures arranged in an array, and each super-pixel structure includes a plurality of wavelength division pixels arranged in an array. Herein, the narrowband transmission spectrums of the plurality of wavelength division pixels of a super-pixel structure may be different from each other; or, there may be wavelength division pixels with a same narrowband transmission spectrum in the plurality of wavelength division pixels of a super-pixel structure.

Exemplarily, different wavelength division pixels 5-1 may be designed as a group of super-pixel structures such as 1*2, 2*2, 2*3, 3*3, etc. as required. Further, N super-pixel structures may cover the entire photosensitive chip 3.

In some optional implementations of the present disclosure, the wavelength division component array 5 may use a photonic crystal, metamaterial, quantum dot, perovskite, etc. as a micro-nano wavelength division component. Specifically, the photonic crystal and metamaterial filter can resonate with light on a wavelength scale, thereby realizing the splitting of natural light; the quantum dot and perovskite filter can absorb or reflect light having different wavelengths based on different material components and sizes, and then realize the splitting of natural light.

However, these wavelength division components perform poorly in narrowband spectral transmission. In addition, the photonic crystal and the metamaterial filter, due to its two-dimensional or one-dimensional periodic sub-wavelength structure based on a single-layer film, requires high-precision electron beam lithography when being prepared, resulting in high process cost and difficulty; although the process cost of the quantum dot and the perovskite filter is low, the optical stability of the material is difficult to guarantee.

Inventors have found through research that a FP integrated optical microcavity based on micro-nano processing is a more preferable micro-nano wavelength division component. The FP integrated optical microcavity interferes and transmits different wavelengths in a cavity layer, to realize narrowband transmission. The FP integrated optical microcavity is prepared based on semiconductor technology, the characteristic size is larger than the working wavelength, the process difficulty is low, and the stability is high. Based on these characteristics, the inventors found that integrating an integrated microcavity wavelength division structure with pixel size directly on a focal plane detector can reduce the size of the spectral detection system to a chip level while maintaining a high number of spectra, and enable the spectral detection system has extremely high stability and reliability.

According to this idea, in some preferred implementations of the present disclosure, the wavelength division component array 5 may adopt an integrated microcavity wavelength division structure array. Specifically, each wavelength division pixel 5-1 in the wavelength division component array 5 may be a microcavity wavelength division structure unit, and the microcavity wavelength division structure unit includes a microcavity lower layer DBR (Distributed Bragg Reflection), an intermediate cavity layer and a microcavity upper layer DBR.

Exemplarily, the short-wave infrared spectrum detector integrated with wavelength division and detection provided in the present disclosure may be a short-wave infrared light spectrum detector monolithically integrated with a wavelength division structure array based on an integrated optical microcavity and a focal plane detector. The focal plane detector (that is, the photosensitive chip 3) may adopt an InGaAs photosensitive chip.

Specifically, referring to the structure shown in FIG. 1, the short-wave infrared spectrum detector provided in the embodiment may include a silicon-based readout circuit 1, an In column interconnection layer 2, an InGaAs photosensitive chip 3, a substrate 4 and an integrated microcavity wavelength division structure array 5 arranged sequentially from bottom to top.

The integrated microcavity wavelength division structure array 5 and the InGaAs photosensitive chip 3 are monolithically integrated on both sides of the substrate 4, without an external mechanical structure for coupling. The wavelength division pixels of the integrated microcavity wavelength division structure array 5 are aligned with the detection pixels of the InGaAs photosensitive chip 3 in a longitudinal direction of space. The alignment relationship may be one-to-one correspondence, or one wavelength division pixel covers a plurality of detection pixels. That is, the integrated microcavity wavelength division structure array 5 may include multiple groups of light pixels, each group of light pixels includes one or more wavelength division pixels, and each wavelength division pixel corresponds to at least one detection pixel (i.e., spectral detection channel) of the InGaAs photosensitive chip 3.

Each wavelength division pixel (i.e., wavelength division microstructure unit 5-1) of the integrated microcavity wavelength division structure array 5 corresponds to a narrowband transmission spectrum. Optionally, each wavelength division pixel may have a different narrowband transmission spectrum.

During spectrum detection, an incident light is first frequency-selected and split by different wavelength division microstructure units 5-1 of the integrated microcavity wavelength division structure array 5, and a light signal after wavelength division is received and converted into an electrical signal by the detection pixel at the corresponding position on the InGaAs photosensitive chip 3, and finally the electrical signal is output to the silicon-based readout circuit 1 by the In column interconnection layer 2.

The In column interconnection layer 2 is configured to transmit the electrical signal of each detection pixel of the InGaAs photosensitive chip 3 to the silicon-based readout circuit 1 through an In column 2-1.

The InGaAs photosensitive chip 3 has a thickness of 2~200 μm and is configured to convert a detected optical signal into an electrical signal.

The thickness of the substrate 4 is 10~1000 μm, and the material is InP, and the substrate 4 is used for the epitaxial growth of the InGaAs photosensitive chip 3 and the preparation of the integrated microcavity wavelength division structure array 5, so as to achieve monolithic integration of the two.

In the embodiments of the present disclosure, the integrated microcavity wavelength division structure array with a pixel-size and the detector photosensitive chip may be integrated and prepared through coating and micro-nano processing technology, which solves the problems of optical crosstalk and instability in traditional mechanical assembly methods. Compared with other types of wavelength division components, the integrated microcavity wavelength division structure can realize narrowband detection with low cost and high stability.

The spectrum of the wavelength division structure in the short-wave infrared wavelength division detector provided by the embodiments of the present disclosure can be flexibly designed and selected. Dozens or even hundreds of spectral channels can be designed through micro-nano processing technology to form a high-precision short-wave infrared wavelength division detector integrated with wavelength division and detection. Compared with multi-spectral infrared detectors in the related art, the detectors provided by the embodiments of the present disclosure have a higher integration degree and a more stable working mode, and have great application value and development prospect in military, aerospace, and civil fields.

Each microcavity wavelength division structure unit 5-1 of the integrated microcavity wavelength division structure array 5 includes a microcavity lower layer DBR 5-1-1, an intermediate cavity layer 5-1-2, and a microcavity upper layer DBR 5-1-3. Each microcavity wavelength division structure unit 5-1 is designed based on the principle of Fabry-Perot optical resonant cavity. Its physical principle is to introduce defect states in one-dimensional photonic crystals. According to the difference of the introduced defect states, a center wavelength of a transmitted light of the wavelength division component may be tuned. N wavelength division components with different transmission center wavelengths are integrated on a same substrate, and N channels narrowband infrared light are respectively transmitted at N different spatial positions to achieve the purpose of integrated wavelength division.

It should be understood that the integrated microcavity wavelength division structure array 5 may be fabricated by electron beam evaporation coating, magnetron sputtering coating, photolithography, etching and other processes, which are not specifically limited in the present disclosure.

In addition, a pixel arrangement of the integrated microcavity wavelength division structure array 5 may be designed according to actual needs. For example, it may be arranged in one dimension or two dimensions. N microcavity wavelength division structure units 5-1 of the integrated microcavity wavelength division structure array 5 may cover the entire InGaAs photosensitive chip 3, and each channel covers a detection pixel of one unit area. Different microcavity wavelength division structure units 5-1 may also be combined into a super-pixel structure in a form of an array, for example, it can be designed as a group of super-pixels such as 1*2, 2*2, 2*3, 3*3, etc., and N super-pixel structures cover the entire InGaAs photosensitive chip 3 to form a short-wave infrared spectrum detector, for example, a multispectral imaging detector with simultaneous imaging and spectrum detection.

The microcavity lower layer DBR 5-1-1 and/or the microcavity upper layer DBR 5-1-3 are composed of dielectric layers alternately grown by high and low refractive index materials, that is, the microcavity lower layer DBR 5-1-1 and/or the microcavity upper layer DB R 5-1-3 may include alternately arranged high refractive index film layers and low refractive index film layers. The intermediate cavity layer 5-1-2 may include a dielectric layer grown with a material having a same or similar refractive index as the low refractive index material in the lower microcavity layer DBR 5-1-1 and/or the microcavity upper layer DBR 5-1-3.

Herein, the high refractive index material and the low refractive index material are relative definitions, that is, as long as the refractive index of the high refractive index material is significantly higher than that of the low refractive index material, the present disclosure does not limit specific numerical range of the refractive index of the two. For example, two materials with obvious refractive index difference may be selected from the following materials as the high refractive index material and the low refractive index material respectively: Si, Ge, $ta_2O_5$, $TiO_2$, $Nb_2O_5$, $Bi_2O_3$, CdS, CdTe, $CeO_2$, CdSe, $Gr_2O_3$, diamond, $Dy_2O_3$, $Fe_2O_3$, GaAs, $HfO_2$, $Ho_2O_3$, InAs, InSb, $In_2O_3$, PbTe, $PbCl_2$, $PbF_2$, Se, $Sb_2O_3$, $Sb_2S_3$, $SnO_2$, $Si_3N_4$, Te, ZnO, ZnSe, SiO, ZnS, $SiO_2$, $Al_2O_3$, $AlO_xN_y$, $AlF_3$, $BiF_3$, $BaF_2$, $CaF_2$, $CeF_3$, CsBr, CsI, $Eu_2O_3$, $Gd_2O_3$, LiF, $LaF_3$, $La_2O_3$, $MgF_2$, MgO, NaF, $Na_3Al_3F_6$, $Nd_2O_3$, $NdF_3$, $Pr_6O_{11}$, $Sc_2O_3$, $SrF_2$, $SmF_3$, $Sm_2O_3$, $ThF_4$, $YbF_3$, $Y_2O_3$, $ZrO_2$.

The microcavity lower layer DBR 5-1-1 and/or the microcavity upper layer DBR 5-1-3 may be composed of m pairs of high and low refractive index film layers, and a pair of high and low refractive index film layers includes a high refractive index film layer and a low refractive index film layer, and a range of m is 2~30.

The thickness of the intermediate cavity layer 5-1-2 may be 0.1~10 μm.

The advantages of the short-wave infrared spectrum detector provided by the embodiments of the present disclosure at least include the following aspects.

1. The integrated microcavity wavelength division structure array is direct monolithic integrated on the substrate of the focal plane detector, without changing the structure of the traditional infrared detector, without increasing the volume of the traditional infrared detector, which makes it capable of spectral recognition, without the traditional wavelength division system with complex structure and bulky volume, greatly reducing the volume of the spectral detection system.
2. A spectral band position and a narrowband half-peak width of each unit of the integrated microcavity wavelength division structure array used in this disclosure can be flexibly adjusted and designed, and the preparation process is simple.
3. A spectral resolution is high, and the spectral resolution can reach 1 nm or even higher by designing a film layer of a monolithic integrated microcavity wavelength division structure.
4. A alignment relationship between the integrated microcavity wavelength division structure array and the InGaAs focal plane detector is diversified. According to different application requirements, it can be designed as a one-to-one correspondence, or one wavelength division pixel corresponds to a plurality of detection pixels; and it can be a linear array or an area array.

Figure 2:
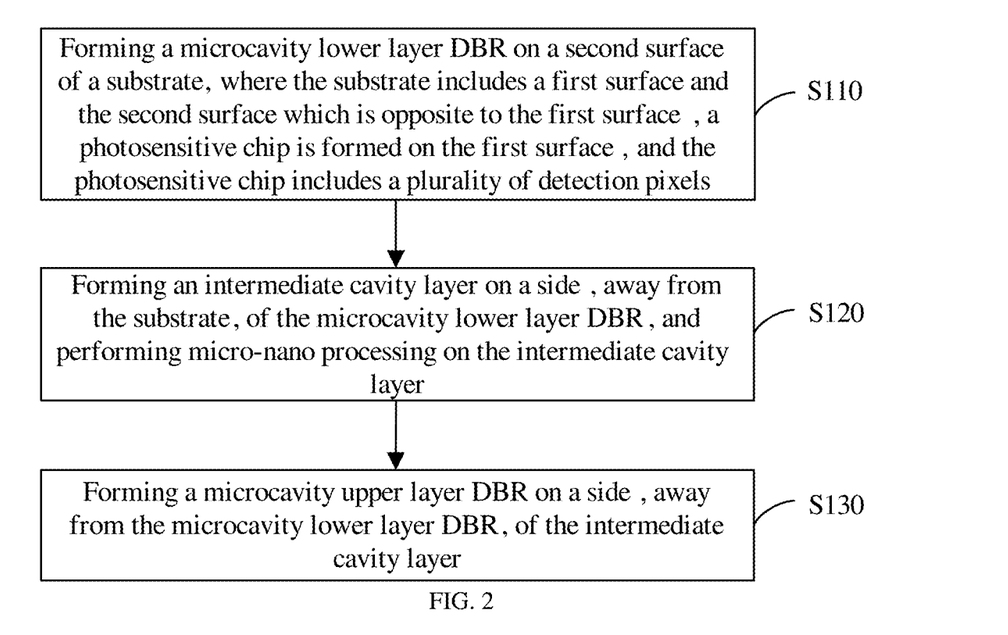
FIG. 2 is a schematic flowchart of a preparation method of a short-wave infrared spectrum detector according to an embodiment of the present disclosure.

FIG. 2 is a schematic flowchart of a preparation method of a short-wave infrared spectrum detector according to an embodiment of the present disclosure. As shown in FIG. 2, the preparation method includes the following aspects.

S110: Forming a microcavity lower layer DBR on a second surface of a substrate, where the substrate includes a first surface and the second surface which is opposite to the first surface, a photosensitive chip is formed on the first surface, and the photosensitive chip includes a plurality of detection pixels.

S120: Forming an intermediate cavity layer on a side, away from the substrate, of the microcavity lower layer DBR, and performing micro-nano processing on the intermediate cavity layer.

S130: Forming a microcavity upper layer DBR on a side, away from the microcavity lower layer DBR, of the intermediate cavity layer.

The microcavity lower layer DBR, the intermediate cavity layer and microcavity upper layer DBR form a wavelength division component array. The wavelength division component array includes a plurality of wavelength division pixels, and an orthographic projection of one wavelength division pixel on the substrate covers an orthographic projection of at least one detection pixel on the substrate. A micro-nano processing is performed on the intermediate cavity layer, so that each wavelength division pixel corresponds to a narrowband transmission spectrum.

According to the preparation method of the short-wave infrared spectrum detector provided by the embodiments of the present disclosure, the wavelength division component array is directly prepared on the substrate of the photosensitive chip by monolithic integration, without using a wavelength division system with a complex structure and a bulky volume, significantly reducing the volume of the detection system, while enabling it to have good spectral recognition ability.

Figure 3:
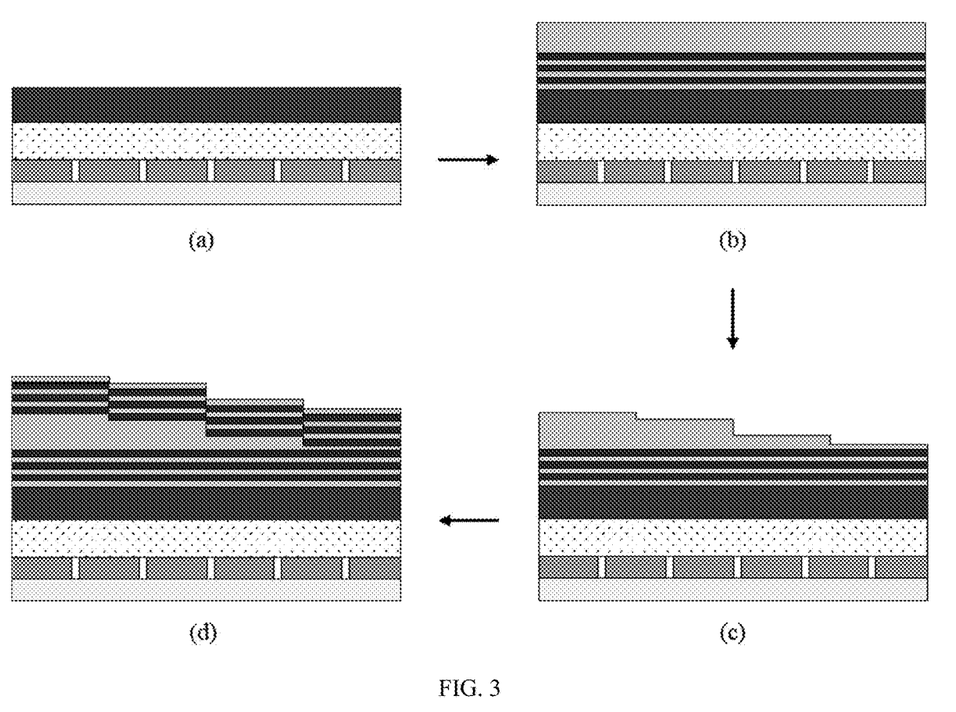
FIG. 3 is a schematic diagram of a preparation process of an exemplary short-wave infrared spectrum detector according to the present disclosure.

Exemplarily, a specific preparation process of a short-wave infrared spectrum detector according to an embodiment of the present disclosure may be shown in FIG. 3. Four main process steps are shown from (a) to (d) in FIG. 3.

(a) Performing flip-chip on an interconnect InGaAs photosensitive chip 3 by adopting a silicon-based readout circuit 1.

(b) Plating, after a substrate 4 is thinned, a microcavity lower layer DBR 5-1-1 of the wavelength division component array 5 on a back of the substrate 4 by using an electron beam thermal evaporation coating process, and plating an intermediate cavity layer 5-1-2.

(c) Performing micro-nano processing on the intermediate cavity layer 5-1-2 by using a gray scale photolithography and reactive ion etching process.

(d) Plating an microcavity upper layer DBR 5-1-3 by using an electron beam thermal evaporation coating process.

In the embodiments of the present disclosure, the integrated microcavity wavelength division structure array with a pixel-size and the detector photosensitive chip may be integrated and prepared through coating and micro-nano processing technology, which solves the problems of optical crosstalk and instability in traditional mechanical assembly methods. Compared with other types of wavelength division components, the integrated microcavity wavelength division structure can realize narrowband detection with low cost and high stability.

Figure 4:
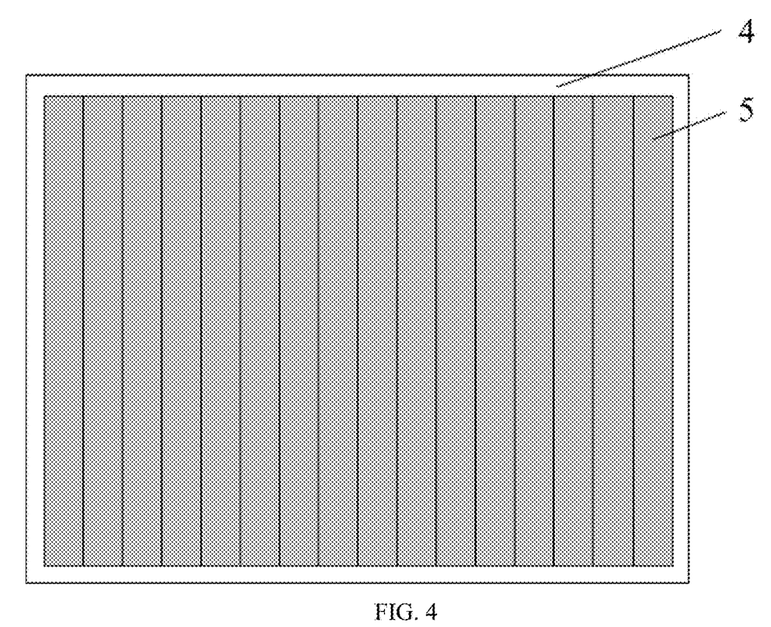
FIG. 4 is a schematic top view of a one-dimensional linear array 16-channel linear array short-wave infrared spectrum detector according to an example of the present disclosure.

FIG. 1 and FIG. 4 show an example of the present disclosure, specifically a one-dimensional linear array 16-channel linear array short-wave infrared spectrum detector, and FIG. 4 is a schematic top view of a one-dimensional linear array 16-channel linear array short-wave infrared spectrum detector, FIG. 1 may be regarded as a cross-sectional front view schematic diagram of one of the wavelength division pixels.

Specifically, in the example, a linear array integrated microcavity wavelength division structure array with 16 spectral channels in the 1380-1666 nm band is prepared on an InGaAs focal plane detector. The wavelength division component uses Si as a high refractive index material, and uses $SiO_2$ as a low refractive index material, the two materials alternately grow to form the microcavity upper layer DBR and the microcavity lower layer DBR of a microcavity wavelength division structure, and the material of the intermediate cavity layer is $SiO_2$. The size of a single detection pixel of the InGaAs focal plane detector is 30*30 μm, and the size of each wavelength division pixel of the linear array wavelength division component is 120*1920 μm.

The number of pairs m of the high and low refractive index film layers in the microcavity upper layer DBR and the microcavity lower layer DBR of the microcavity wavelength division structure is 3, that is, a film structure of the microcavity upper layer DBR is $(LH)^3$, a film structure of the microcavity lower layer DBR is $(HL)^3$, and a film structure of the intermediate cavity layer is xL. Among them, H is a high refractive index film layer, the material is Si, and the thickness is 144 nm; L is a low refractive index film layer, the material is $SiO_2$, and the thickness is 286 nm; x is a thickness coefficient of a film layer (that is, the material of the intermediate cavity layer is the same as L, and the thickness of the intermediate cavity layer is x times as thick as L). The value of x may be changed by use combined etching method, a transmission peak position of the integrated microcavity wavelength division structure array may be varied with x linear adjustment, and spectral peak positions of the 16 channels are 1402 nm, 1420 nm, 1437 nm, 1454 nm, 1472 nm, 1490 nm, 1507 nm, 1525 nm, 1543 nm, 1560 nm, 1578 nm, 1595 nm, 1613 nm, 1631 nm, 1648 nm, 1666 nm, respectively.

After the 16-channel linear array short-wave infrared spectrum detector is prepared, its cross-section structure is shown in FIG. 1, and its top view structure is shown in FIG. 4. Each microcavity wavelength division structure unit 5-1 corresponds to a row of detection pixels on the InGaAs photosensitive chip 3.

Figure 5:
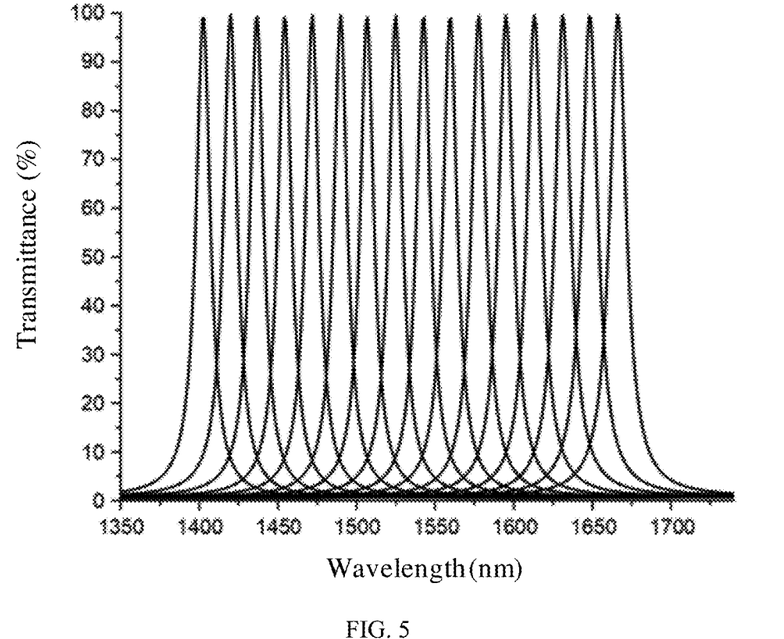
FIG. 5 is a response spectrum diagram of a one-dimensional linear array 16-channel linear array short-wave infrared spectrum detector according to an example of the present disclosure.

A response spectrum of the multi-spectral detector in this example is shown in FIG. 5, and 16 narrowband spectra have good separation, and half-peak widths are all less than 20 nm. After combining the prepared multi-spectral detector with an imaging system, multi-spectral imaging with 16 spectral channels may be performed on target objects and scenes.

Figure 6:
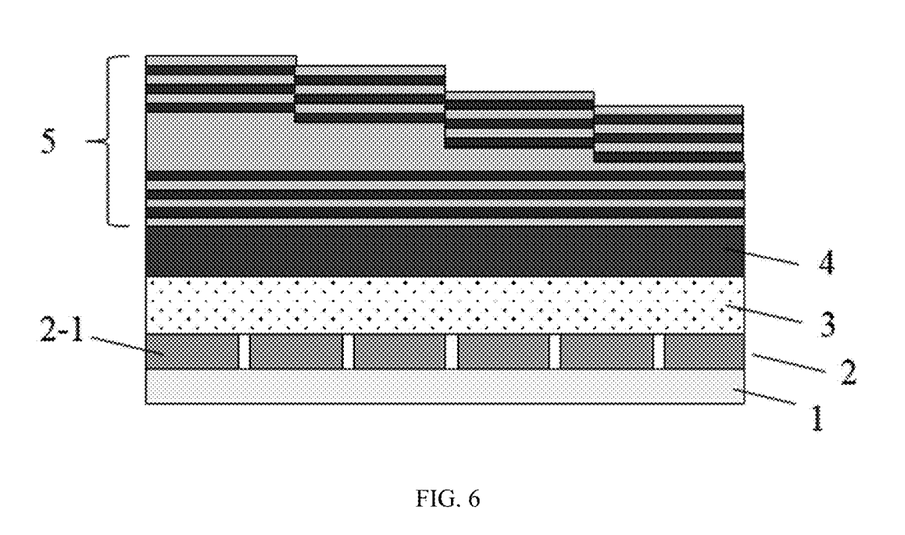
FIG. 6 is a schematic diagram of a cross-sectional front view of a super-pixel structure in a staring imaging four-channel short-wave infrared spectrum detector according to another example of the present disclosure.
Figure 7:
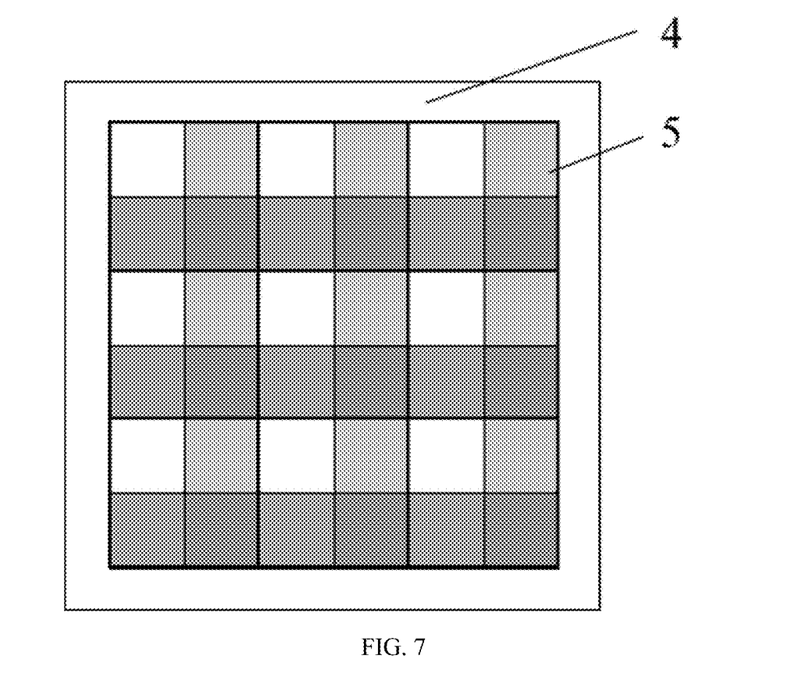
FIG. 7 is a schematic top view of a staring imaging four-channel short-wave infrared spectrum detector according to another example of the present disclosure.

FIG. 6 and FIG. 7 show another example of the present disclosure, specifically a staring imaging four-channel short-wave infrared spectrum detector. FIG. 6 is a schematic diagram of a cross-sectional front view of one of the super-pixel structures, and FIG. 7 is a schematic diagram of a top view of an array composed of super-pixel structures.

Specifically, in this example, in a 1000-1500 nm band, four microcavity wavelength division structure units 5-1 with different transmission spectra are formed into a super-pixel structure, and a super-pixel structure area array is integrated into a wavelength division component array, to form a four-channel super-pixel short-wave infrared imaging spectrum detector.

The integrated microcavity wavelength division structure array 5 uses $TiO_2$ as a high refractive index material, uses $SiO_2$ as a low refractive index material, the two materials grow alternately to form the microcavity upper layer DBR and the microcavity lower layer DBR, and the material of the intermediate cavity layer is $SiO_2$.

The size of a single detection pixel of the focal plane detector is 20*20 μm, and the size of each wavelength division pixel of the linear array wavelength division component is 80*80 μm. The number of pairs m of the high and low refractive index film layers in the DBR is 2, that is, a film structure of the microcavity upper layer DBR is $(LH)^2$, a film structure of microcavity lower layer DBR is $(HL)^2$, the intermediate cavity layer of the microcavity is xL. The thickness of each layer of high refractive index material $TiO_2$ is 80 nm; the thickness of each layer of low refractive index material $SiO_2$ is 188 nm; x is a film thickness coefficient. The value of x may be changed by use combined etching method, a transmission peak position of the wavelength division array may be varied with x linear adjustment, and spectral peak positions of the four channels are 1100 nm, 1200 nm, 1300 nm, 1400 nm respectively.

It should be understood that the process of the staring imaging four-channel short-wave infrared spectrum detector is similar to the foregoing embodiments and examples, and will not be repeated here.

Figure 8:
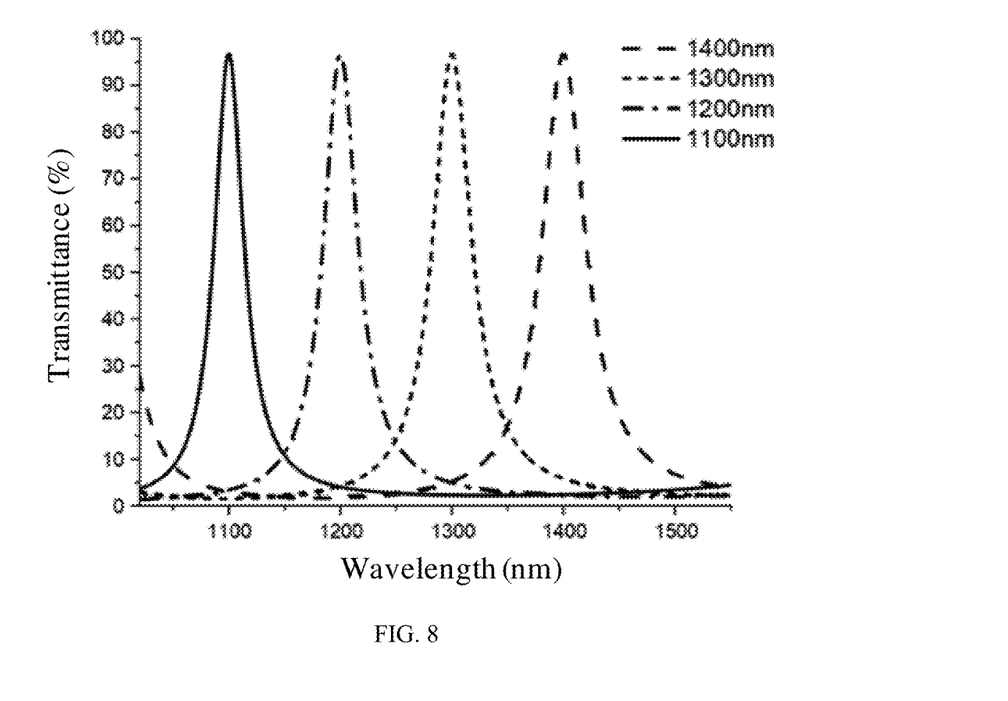
FIG. 8 is a response spectrum diagram of a staring imaging four-channel short-wave infrared spectrum detector according to another example of the present disclosure.

A response spectrum of the four-channel spectral detector of this example is shown in FIG. 8. After the prepared multi-spectral detector is combined with an imaging system, the target object and scene can be imaged and detected in 4 spectral channels, and image spectral information may be obtained while staring at the imaging.

Figure 9:
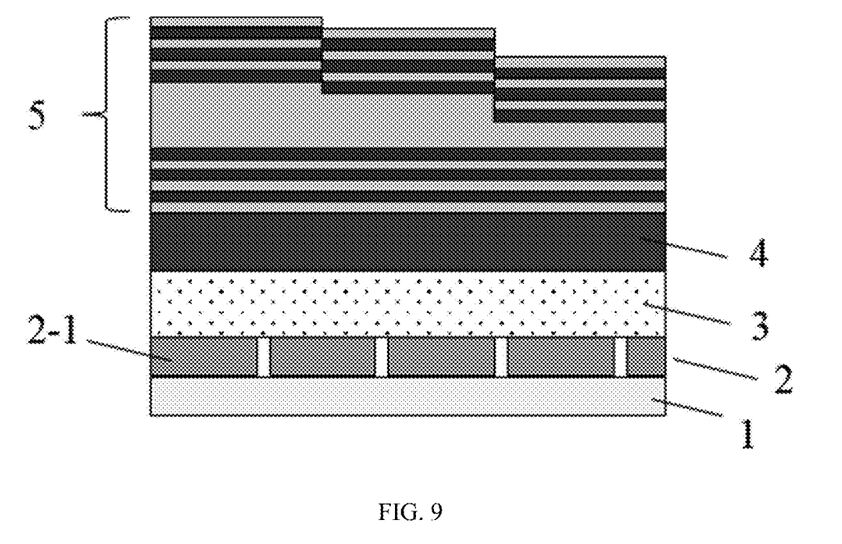
FIG. 9 is a schematic diagram of a cross-sectional front view of a super-pixel structure in a nine-channel area array short-wave infrared multi-spectral detector according to another example of the present disclosure.
Figure 10:
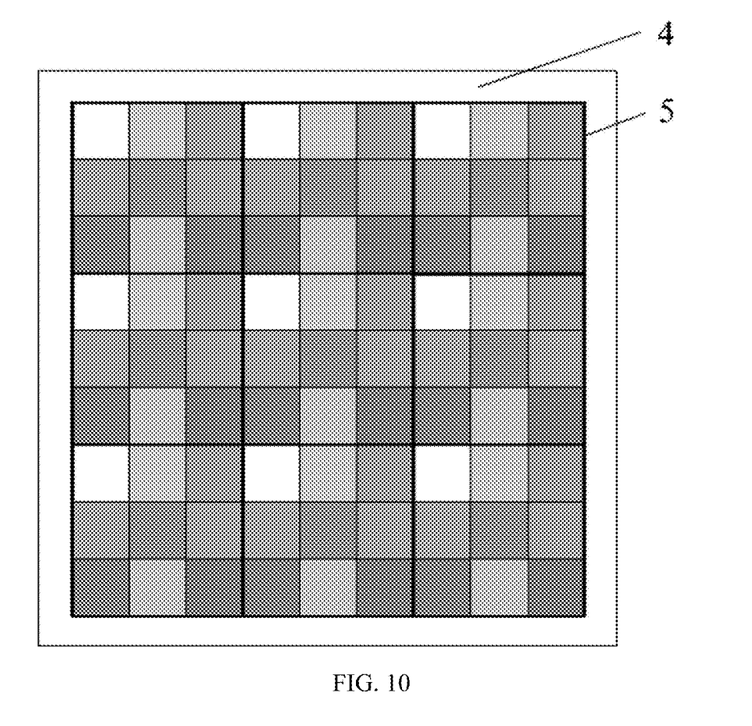
FIG. 10 is a schematic top view of a nine-channel area array short-wave infrared multi-spectral detector according to another example of the present disclosure.

FIG. 9 and FIG. 10 show another example of the present disclosure, specifically a nine-channel area array short-wave infrared multi-spectral detector integrated with wavelength division and detection. FIG. 9 is a schematic diagram of a cross-sectional front view of one of the super-pixel structures. FIG. 10 is a schematic top view of an array composed of super-pixel structures.

Specifically, in this example, in a 1000-1700 nm band, 9 microcavity wavelength division structure units 5-1 with different transmission spectra is formed into a super-pixel structure, and a super-pixel structure area array is integrated into a wavelength division component array, to form a nine-channel short-wave infrared multi-spectral detector.

The integrated microcavity wavelength division structure array 5 uses Si as a high refractive index material, and uses $SiO_2$ as a low refractive index material, the two materials grow alternately to form the microcavity upper layer DBR and the microcavity lower layer DBR, and the material of the intermediate cavity layer is $SiO_2$.

The size of a single detection pixel of the focal plane detector is 10*10 μm, and the size of each wavelength division pixel of an area array wavelength division component is 60*60 μm. The number of pairs m of the high and low refractive index film layers in the DBR is 12, that is, a film structure of the microcavity upper layer DBR is $(LH)^{12}$, a film structure of the microcavity lower layer DBR $(HL)^{12}$, the intermediate cavity layer of the microcavity is xL. The thickness of each layer of high refractive index material Si is 120 nm; the thickness of each layer of low refractive index material $SiO_2$ is 240 nm; x is a film thickness coefficient. The value of x may be changed by use combined etching method, a transmission peak position of the wavelength division array may be varied with x linear adjustment, and spectral peak positions of the 9 channels are 1200 nm, 1250 nm, 1300 nm, 1350 nm, 1400 nm, 1450 nm, 1500 nm, 1550 nm, 1600 nm, respectively.

It should be understood that the process of the nine-channel area array short-wave infrared multi-spectral detector is similar to the foregoing embodiments and examples, and will not be repeated here.

Figure 11:
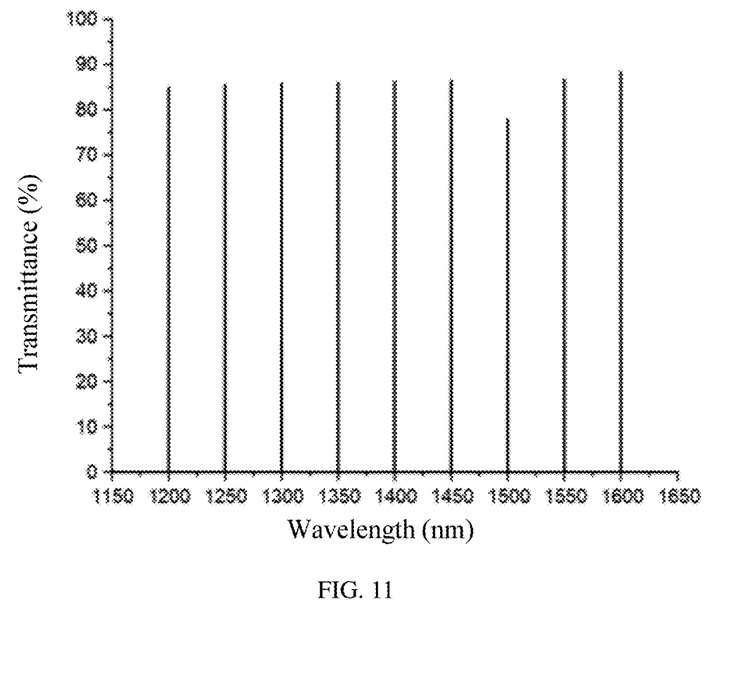
FIG. 11 is a response spectrum diagram of a nine-channel area array short-wave infrared multi-spectral detector according to another example of the present disclosure.

A response spectrum of the nine-channel spectral detector of this example is shown in FIG. 11. The 12 pairs of high and low refractive index film layers in the DBR make a bandwidth of each spectral channel less than 1 nm, which can be applied to extremely narrowband multi-spectral detection with high sensitivity.

In the present disclosure, the wavelength division structure and the photosensitive chip are integrated, so that each pixel has the ability of frequency-selective wavelength division and detection, and a short-wave infrared spectrum detector integrated with wavelength division and detection is formed, realizing the miniaturization of the short-wave infrared spectral detection system, flexible design and free combination of the spectral channels, and the advantages of high stability and process compatibility.

Apparently, the embodiments described above are some embodiments of the present disclosure, and are not all embodiments, and are not intended to limit the scope of protection of the present disclosure. Based on the embodiments of the present disclosure, any modification, equivalent replacement, improvement, etc. made by a person of ordinary skill in the art within the spirit and principle of the present disclosure shall be included within the protection scope of the present disclosure.

What is claimed is:

1. A short-wave infrared spectrum detector, comprising:
   a photosensitive chip, comprising a plurality of detection pixels;
   a substrate; and
   a wavelength division component array, comprising a plurality of wavelength division pixels, each of the plurality of wavelength division pixels corresponding to a narrowband transmission spectrum,
   wherein the photosensitive chip and the wavelength division component array are monolithically integrated on both sides of the substrate, and an orthographic projection of each of the plurality of wavelength division pixels on the substrate covers an orthographic projection of at least one detection pixel on the substrate.

2. The short-wave infrared spectrum detector according to claim 1, further comprising:
   a silicon-based readout circuit, arranged on a side, away from the substrate, of the photosensitive chip; and
   an In column interconnection layer, arranged between the photosensitive chip and the silicon-based readout circuit, configured to transmit an electrical signal of the photosensitive chip to the silicon-based readout circuit.

3. The short-wave infrared spectrum detector according to claim 1, wherein the wavelength division component array is an integrated microcavity wavelength division structure array, and each of the plurality of wavelength division pixels is one microcavity wavelength division structure unit, and the microcavity wavelength division structure unit comprises a microcavity lower layer DBR, an intermediate cavity layer and a microcavity upper layer DBR.

4. The short-wave infrared spectrum detector according to claim 3, wherein the microcavity lower layer DBR and/or the microcavity upper layer DBR are composed of m pairs of high and low refractive index film layers, and one pair of high and low refractive index film layers comprises one high refractive index film layer and one low refractive index film layer, and a value of m is 2~30.

5. The short-wave infrared spectrum detector according to claim 3, wherein a thickness of the intermediate cavity layer is 0.1~10 μm.

6. The short-wave infrared spectrum detector according to claim 1, wherein the plurality of wavelength division pixels are arranged in one dimension or two dimensions.

7. The short-wave infrared spectrum detector according to claim 1, wherein the plurality of wavelength division pixels comprise a plurality of super-pixel structures arranged in an array, wherein each of the plurality of super-pixel structures comprises a plurality of wavelength division pixels arranged in an array.

8. The short-wave infrared spectrum detector according to claim 1, wherein a thickness of the photosensitive chip is 2~200 μm.

9. The short-wave infrared spectrum detector according to claim 1, wherein a thickness of the substrate is less than 1000 μm.

10. A preparation method of a short-wave infrared spectrum detector, comprising:
    forming a microcavity lower layer DBR on a second surface of a substrate, the substrate comprising a first surface and the second surface which is opposite to the first surface, and a photosensitive chip being formed on the first surface, the photosensitive chip comprising a plurality of detection pixels;

forming an intermediate cavity layer on a side, away from the substrate, of the microcavity lower layer DBR, and performing micro-nano processing on the intermediate cavity layer; and forming a microcavity upper layer DBR on a side, away from the microcavity lower layer DBR, of the intermediate cavity layer, wherein the microcavity lower layer DBR, the intermediate cavity layer and the microcavity upper layer DBR form a wavelength division component array, the wavelength division component array comprises a plurality of wavelength division pixels, and an orthographic projection of each of the plurality of wavelength division pixels on the substrate covers an orthographic projection of at least one detection pixel on the substrate, and micro-nano processing is performed on the intermediate cavity layer, so that each of the plurality of wavelength division pixels corresponds to a narrowband transmission spectrum.

* * * * *